(12) United States Patent
Nemoto (10) Patent No.: US 7,789,987 B2
(45) Date of Patent: Sep. 7, 2010

(54) METHOD OF MANUFACTURING RESIN HOLLOW BODY USING A BLOW MOLDING DIE ASSEMBLY

(75) Inventor: Mikio Nemoto, Ichihara (JP)

(73) Assignee: Mitsui Chemicals, Inc, Tokyo (JP)

( * ) Notice: Subject to any disclaimer, the term of this patent is extended or adjusted under 35 U.S.C. 154(b) by 876 days.

(21) Appl. No.: 11/569,925

(22) PCT Filed: Jun. 1, 2005

(86) PCT No.: PCT/JP2005/010073

§ 371 (c)(1),
(2), (4) Date: Dec. 1, 2006

(87) PCT Pub. No.: WO2005/118255

PCT Pub. Date: Dec. 15, 2005

(65) Prior Publication Data

US 2008/0038497 A1    Feb. 14, 2008

(30) Foreign Application Priority Data

Jun. 3, 2004    (JP)    ............................. 2004-165309

(51) Int. Cl.
B29C 49/00    (2006.01)
(52) U.S. Cl. ....................... 156/245; 156/256; 156/264; 156/308.4
(58) Field of Classification Search ................. 156/242, 156/245, 285, 287; 264/510, 516, 545
See application file for complete search history.

(56) References Cited

U.S. PATENT DOCUMENTS

| | | | |
|---|---|---|---|
| 4,423,000 A | * | 12/1983 | Teraoka ........................ 264/524 |
| 6,136,125 A | * | 10/2000 | Ihara et al. ................... 156/213 |

| | | |
|---|---|---|
| 2001/0015513 A1 | 8/2001 | Schaftingen et al. |
| 2005/0104260 A1 | 5/2005 | Van Schaftingen et al. |

FOREIGN PATENT DOCUMENTS

| | | |
|---|---|---|
| JP | 55-163134 | 12/1980 |
| JP | 01-101830 | 4/1989 |
| JP | 02-074318 | 3/1990 |
| JP | 06-210709 | 8/1994 |
| JP | 08-072134 | 3/1996 |
| JP | 10-157738 | 6/1998 |
| JP | 2004-160719 | 6/2004 |

OTHER PUBLICATIONS

International Search Report for PCT/JP2005/010073 dated Jul. 19, 2005.

* cited by examiner

Primary Examiner—Richard Crispino
Assistant Examiner—Barbara J. Musser
(74) Attorney, Agent, or Firm—Turocy & Watson, LLP (57) ABSTRACT

To provide a method of manufacturing a resin hollow molded body wherein, predetermined parts can be simply attached when attaching them in the inside of the blow molded hollow body; and the resin hollow molded body, such as a vehicle fuel tank containing a volatile liquid inside thereof, has a good barrier property against a gas component.

There is provided a method for obtaining a product of a hollow molded body characterized in that: a thermoplastic resin parison 6, extruded to a tubular state, is expanded by blow molding; then dies 2, 4 are once divided to assemble predetermined parts 32, 34 inside of the hollow molded body; and the surfaces of the divided dies are joined again.

3 Claims, 8 Drawing Sheets

METHOD OF MANUFACTURING RESIN HOLLOW BODY USING A BLOW MOLDING DIE ASSEMBLY

TECHNICAL FIELD

The present invention relates to a blow molding die assembly, a method of manufacturing a resin hollow body using the blow molding die assembly and a hollow molded body manufactured by the manufacturing method, and, in particular, relates to a vehicle fuel tank.

BACKGROUND ART

As an automobile fuel tank, there is provided a resin tank in place of a metal tank in response to a request for reduction in weight, and the resin tank can be obtained by hollow blow molding of thermoplastic resin such as polyethylene, etc. In general, a resin material is easily permeated by a volatile component such as gasoline and the like as compared with metal material, a barrier layer with a less permeating property composed of EVOH, nylon or the like is ordinarily disposed to an inner layer and an intermediate layer, and there is proposed a resin tank obtained by multilayer molding with polyolefin and barrier material layers (patent documents 1 and 2).

In general, a fuel feed port for feeding fuel from outside, a return path member for returning excessive fuel from an engine and the like are disposed outside of an automobile fuel tank. Further, a wave barrier and the like are disposed inside of the tank to prevent generation of noise caused by fluctuation of liquid fuel level.

When an automobile fuel tank and the like in which parts must be assembled to the inside of the hollow body as described above, conventionally, after an outer shape of the tank is given by blow molding, a hole is formed in the hollow molded body and predetermined parts are fitted to the hole. Accordingly, in the conventional manufacturing method, a step for forming the hole is necessary, from which there has been a problem of increasing man-hours.

Further, since resin material is permeated easily by a volatile component as compared with metal, although a barrier layer with low permeating property such as EVOH (ethylene/vinyl alcohol copolymer), polyamide, or the like is provided when resin material is applied to a fuel tank. However, since parts formed of different materials have no barrier layer between them, there is a problem that a volatile gas such as gasoline and the like passes through the parts.

It is also possible to provide a part attached later with a barrier layer to prevent the gas permeating property. Even in this case, however, since no barrier layer exists in the portions of the parts welded to the hollow molded body, a gas barrier property cannot be sufficiently provided, from which a problem of gas permeation arises.

Further, to install a wave barrier inside a hollow molded body such as a fuel tank and the like, it is also possible to dent a tank wall itself inward and to use the concave wall portion as a wave barrier. In this case, however, a wall thickness of the concave portion gets thinner, then an entire wall thickness must be increased, from which a problem of an increase of weight arises.

Further, the patent document 2 discloses a resin fuel vessel formed by fusion bonding injection molded half-divided bodies contacting with each other. However, since a problem to be solved by the invention of the patent document 2 is an uneven wall thickness of a hollow body made by hollow blow molding, the patent document 2 relates to a method of forming injection molded bodies having a uniform wall thickness and forming a hollow body by coupling them. Accordingly, a technical idea of obtaining an integrated hollow body by joining half-divided bodies after assembling parts in them and decorating and processing the inner surfaces of them. Further, since the half-divided bodies molded separately are integrated later, an innermost layer must be composed of a barrier layer to prevent discontinuous barrier layer on a joint surface. When a dropping impact is applied to a hollow molded body, the inner most layer, which is most subjected to be stressed, is easy to be broken. However, since EVOH and polyamide are ordinarily inferior to polyolefin in dropping impact resistance, an arrangement having the innermost layer composed of the barrier layer is disadvantageous. Further, many steps such as injection molding half-divided bodies, releasing them from dies, heating and melting fusion bonding portions of the half-divided bodies facing to each other, and jointing them by making them contact to each other. Since fusion bonded portions of the injection molded half-divided bodies must be heated and melted again, energy efficiency is also bad. Consequently, there is need for a method of manufacturing a hollow molded body without a volatile component permeation through the body using a conventional hollow blow molding apparatus.

The patent document 3 discloses a method of cutting off an extruded parison. However, since a thick parison must be cut off before it is blow molded by the method of the patent document 3, there may be a case that it is difficult to cut off a multilayered passion. Further, since the parison is blown after it is welded again, a welded portion is not blow extended, and thus wall thickness of the hollow molded body is made uneven.

Patent Document 1: Japanese Patent Application Laid-Open Publication No. S55-163134 (1980-163134)

Patent Document 2: Japanese Patent Application Laid-Open Publication No. H10-157738 (1998-157738)

Patent Document 3: Japanese Patent Application Laid-Open Publication No. 2002-103427

DISCLOSURE OF THE INVENTION

Problems to be Solved by the Invention

In view of the above-mentioned circumstances, an object of the present invention is to provide a blow molding die assembly used for molding a hollow molded body, in which predetermined parts can be easily attached to predetermined positions inside the blow molded hollow body and volatile liquid can be contained.

Further, an object of the present invention is to provide a manufacturing method that is preferable to manufacture a resin hollow molded body having a good barrier property against a gas component. Further, an object of the present invention is to provide a resin hollow molded body, a vehicle fuel tank in particular, that can prevent leakage of volatile component as far as possible.

Means for Solving the Problems

A blow molding die assembly according to the present invention includes a pair of main dies 2, 4 formed with a dividable cavity therein by closing the open end surfaces 2a, 4a thereof with each other, and a pair of slide dies 12a, 12b being disposed outside of the pair of main dies 2, 4 and having abutting portions 12c, 12d that move between first positions where the abutting portions 12c, 12d project outward from the open end surfaces 2a, 4a of the main dies 2, 4 and second positions where the abutting portions are located inward of the open end surfaces 2a, 4a.

Using the die assembly, a hollow molded body can be obtained by loading a parison in the cavity in the assembly, closing the dies, expanding the parison with a gas, and thereafter opening the dies.

Here, it is preferable that the widths of the abutting portions 12c, 12d of the slide dies 12a, 12b are 5 mm or less.

When the widths of the abutting portions are within the above range, the hollow molded body can be easily divided when the dies are opened.

Further, a method of manufacturing a resin hollow body according to the present invention is a method of manufacturing a resin hollow body by hollow blow molding including a step of obtaining a hollow molded body by blow molding a thermoplastic resin parison in a cavity of dividable dies (assumed that the parison is not cut off to two or more pieces before it is blow molded), a step of dividing the hollow molded body by opening the dividable dies after the parison is blow molded in the cavity in the dividable dies, a step of attaching at least one part on an inner surface of divided hollow molded bodies and/or modifying the inner surfaces of the divided hollow molded bodies, and a step of obtaining an integrated hollow body by welding the divided hollow bodies with the dies closed.

It is preferable that the steps are carried out at a temperature at which the resin hollow body has plastic property so that it can be divided and welded as well as at a temperature equal to or higher than a softening temperature of the thermoplastic resin.

Further, it is preferable that the dies described above are used in the method of manufacturing the resin hollow body according to the present invention.

That is, a method of manufacturing a resin hollow body using the blow molding die assembly according to claim 1 or 2 includes a step of obtaining a hollow molded body by blow molding a thermoplastic resin parison in the cavity in the dividable dies in a state in which the abutting portions 12c, 12d are located at the first positions where they project outward from the open end surfaces 2a, 4a (assumed that the parison is not cut off to two or more pieces before it is blow molded), a step of dividing the hollow molded body by opening the dividable dies after the parison is blow molded in the cavity in the dividable dies, a step of attaching at least one part on an inner surface of the divided hollow molded bodies and/or modifying the inner surfaces of the divided hollow molded bodies in a state in which the abutting portions 12c, 12d are located at either of the first positions and the second positions, and a step of obtaining an integrated hollow body by welding the divided hollow bodies with the dies closed in a state in which the abutting portions 12c, 12d are located at the second positions where they are located inner than the open end surfaces 2a, 4a.

Further, a method of manufacturing a resin hollow body using the blow molding die assembly according to the present invention includes a parison clamping step 10 for clamping a thermoplastic resin parison 6, extruded to a tubular state, in the cavity of the pair of main dies 2, 4 and clamping the parison 6 by the abutting portions 12c, 12d of the slide dies 12a, 12b by disposing the slide dies 12a, 12b at the first positions where they project from open end surfaces 2a, 4a of the main dies 2, 4, an inside die suctioning step 15 for sucking the area between the outer surface of the parison 6 and inner surfaces of the main dies 2, 4 by suction means from outside, wherein parison 6 is clamped by the abutting portions 12c, 12d of the pair of slide dies 12a, 12b at the parison clamping step 10, a parison expanding step 20 for expanding the parison 6 by introducing a gas into the inside of the parison 6 either before the inside die suctioning step 15 is carried out, after the inside die suctioning step 15 is carried out, or at the time when the inside die suctioning step 15 is carried out, a primary die opening step 30 for opening the pair of main dies 2, 4 along with half-divided hollow molded bodies 6a, 6b after the outer surface of the parison 6 is expanded at the parison expanding step 20 and is caused to come into intimate contact with inner peripheral surfaces of the main dies 2, 4, a parts assembly step 40 for attaching predetermined parts 32, 34 and the like, which are previously formed as separate members, on the inner surfaces of the parison 6 in the pair of main dies 2, 4 separated from each other at the primary die opening step 30, a secondary die closing step 50 for closing the pair of main dies 2, 4 again after the predetermined parts 32, 34 and the like are assembled to the inner surface of the hollow molded body 6 in the main dies 2, 4 at the parts assembly step 40, a re-fuse bonding step 60 for joining the abutting portions of the half-divided hollow molded bodies 6a, 6b closed at the secondary die closing step 50, and a secondary die opening step 70 for taking out a product of a hollow molded body integrated at the re-fuse bonding step 60 from the main dies 2, 4, wherein the steps of the parison clamping step 10, the an inside die suctioning step 15, the parison expanding step 20 and the primary die opening step 30 are carried out in a state in which the abutting portions 12c, 12d of the slide dies are located at first positions where they project outward from the open end surfaces 2a, 4a of the main dies 2, 4 and the steps of the secondary die closing step 50 and the re-fuse bonding step 60 are carried out in a state in which the abutting portions 12c, 12d of the slide dies are located at second positions where they are located inward of the open end surface 2a, 4a of the main dies 2, 4.

According to the present invention having the above steps, since the parts can be attached to the inside while the hollow blow molding step is being carried out, a step for forming holes for attaching the parts after the molding step becomes unnecessary. Further, since the barrier layers do not become discontinuous in the portions where the parts are attached, sufficient gas tightness can be secured. The gas introduced at the parison expanding step is preferably air.

Further, the hollow molded body according to the present invention is manufactured by the resin hollow body manufacturing method having the steps described above.

Since a hollow molded body, an automobile fuel tank in particular, manufactured by the method has a sufficient barrier property, it can prevent leakage of volatile gas component and the automobile fuel tank can be easily manufactured using an existing blow hollow molding apparatus.

Advantages

According to the manufacturing method of a resin hollow molded body using the blow molding die assembly according to the present invention, excellent workability can be achieved because a step for closing a hole formed to the resin hollow molded body by welding or fusing becomes unnecessary. Further, since a welded portion or a fused portion for sealing a hole is eliminated, even if gasoline and the like having high permeating property are contained in the hollow molded body, leakage of a gas component can be effectively prevented.

Further, the hollow molded body obtained with the method of the invention, the automobile fuel tank in particular, is light in weight and suitable for containing fuel having high permeating property such as gasoline and the like.

REFERENCE NUMERALS 2, 4 die
6 parison (hollow molded body)
10 parison clamping step (primary die closing step)
12a, 12b slide die
15 inside die suctioning step
20 parison expanding step
22 air nozzle
30 primary die opening step
40 parts assembly step
50 secondary die closing step
60 re-fuse bonding step
70 secondary die closing step

BEST MODE FOR CARRYING OUT THE INVENTION

Figure 1:
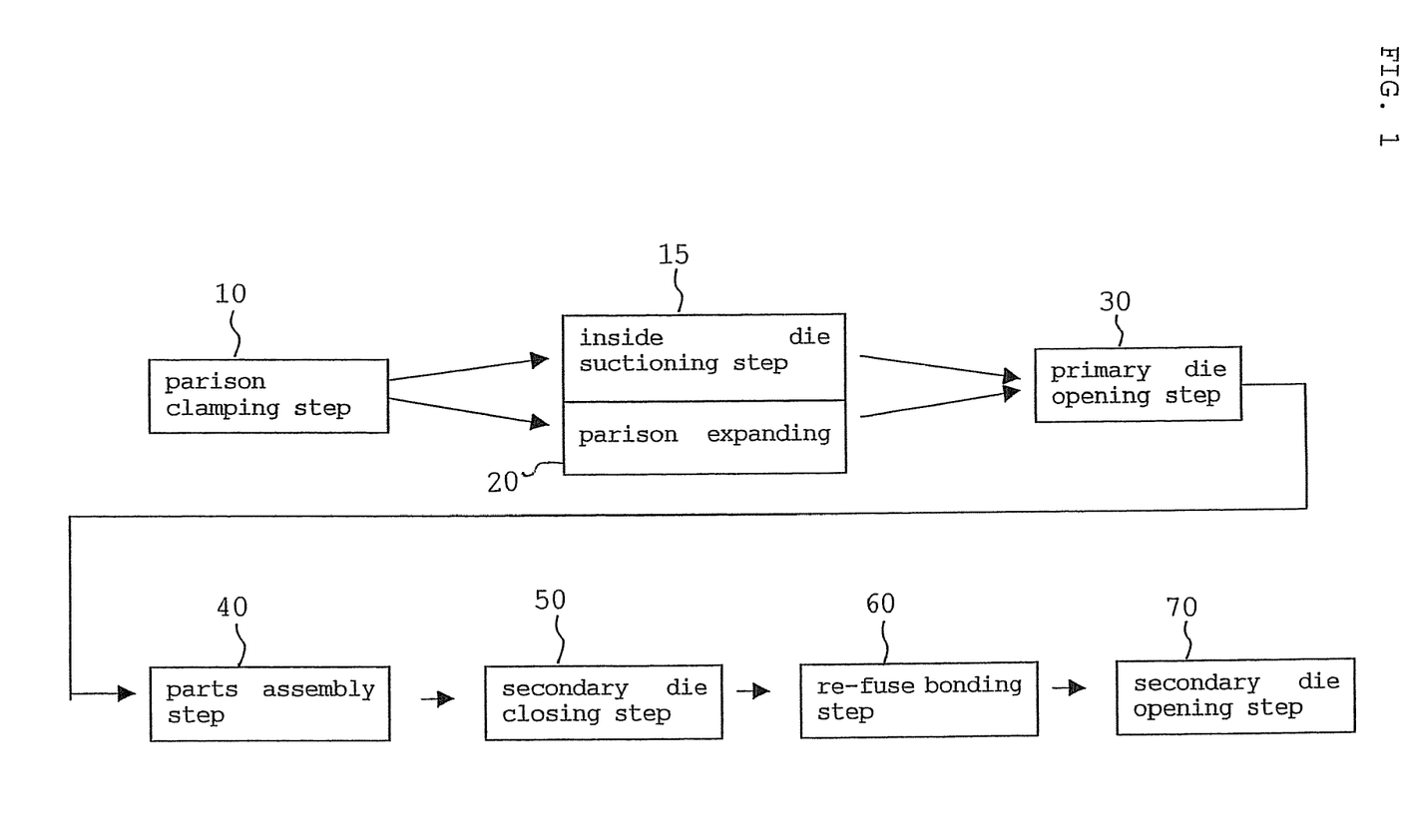
FIG. 1 is a chart showing steps of a manufacturing method of the present invention.
Figure 2:
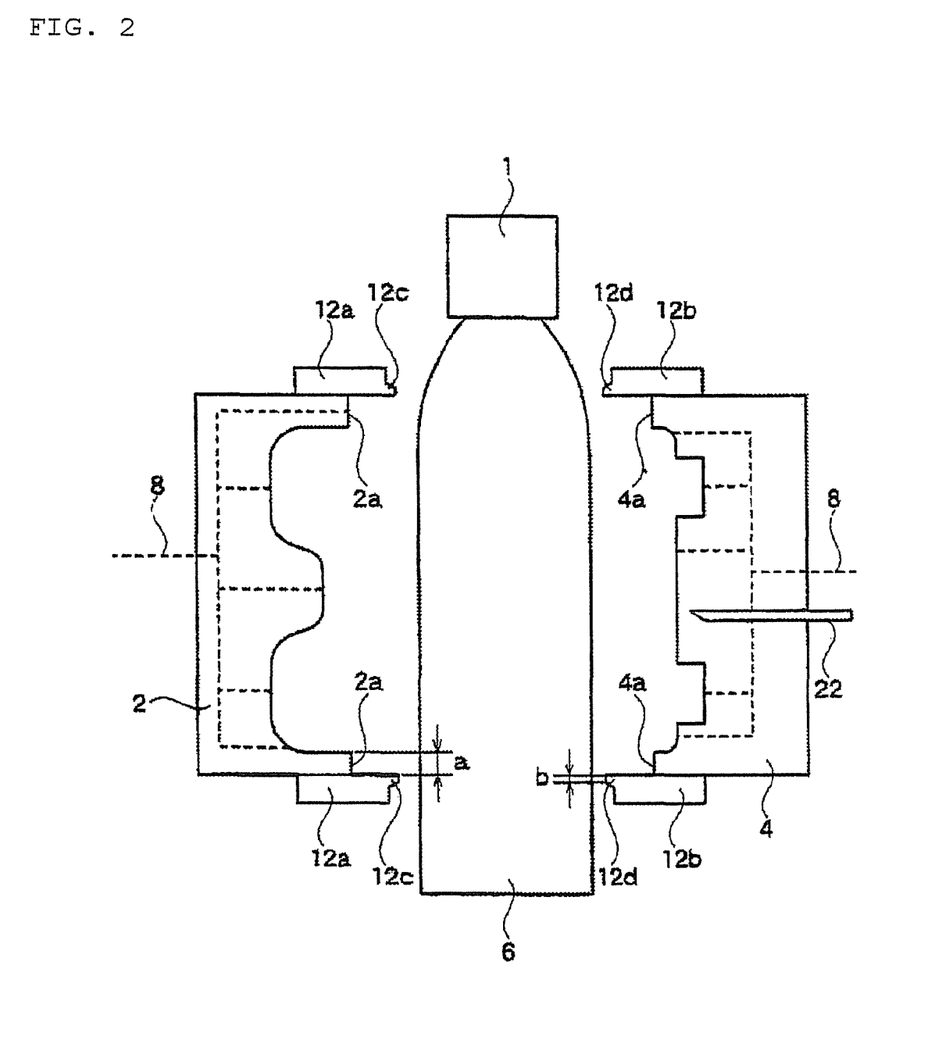
FIG. 2 is a die layout view in the parison clamping step as the first step of the manufacturing method of the present invention.

An embodiment of the manufacturing method of a resin hollow body according to the present invention will be explained with reference to the figures. FIG. 1 is a block diagram showing steps of the manufacturing method of the resin hollow body according to the present invention. FIG. 2 is a sectional view of dies for embodying the manufacturing method.

In the manufacturing method of the resin hollow body according to the present invention, thermoplastic resin such as polyethylene is plasticized by an extruder and a tubular parison is obtained. Thereafter, the parison is inserted into dies before it is not cooled and solidified, and then air is introduced into the parison. Subsequently, the dies are separated once, and after parts are attached to the half-divided parisons (hollow molded bodies) in using a released space of the dies, the dies are abutted again, and a product can be obtained by re-fuse bonding the parisons.

Note that, in the description, a state of the tubular parison after it is blown with compressed air and the like is called a hollow molded body.

In addition, application of the hollow molded body manufactured by the present invention is not particularly restricted, it is, for example, a fuel tank. It may be used for the fuel tank of equipment having an engine such as an automobile, a motor bicycle, an agricultural working vehicle, and may be also used for a fuel transportation vessel. It is particularly preferably used for an automobile fuel tank. Consequently, as shown in FIGS. 2 to 7, the inner surface of the die 2 corresponds to a shape of the bottom portion of a fuel tank, and the inner surface of the other die 4 corresponds to a shape of the upper portion of the fuel tank. Further, each branched air suction path 8 connected to a pressure reducing means is formed in the dies 2, 4 so that the inside of a cavity can be approximately equally sucked through the branched air suction paths 8. Further, movable slide dies 12a, 12b each arranged as an integrated body are disposed to the side openings of the dies 2, 4 respectively for clamping both end portions of the parison 6, and these slide dies 12a, 12b are attached to the open end surfaces 2a, 4a of the main dies 2, 4 by a cylinder device and the like.

Figure 4:
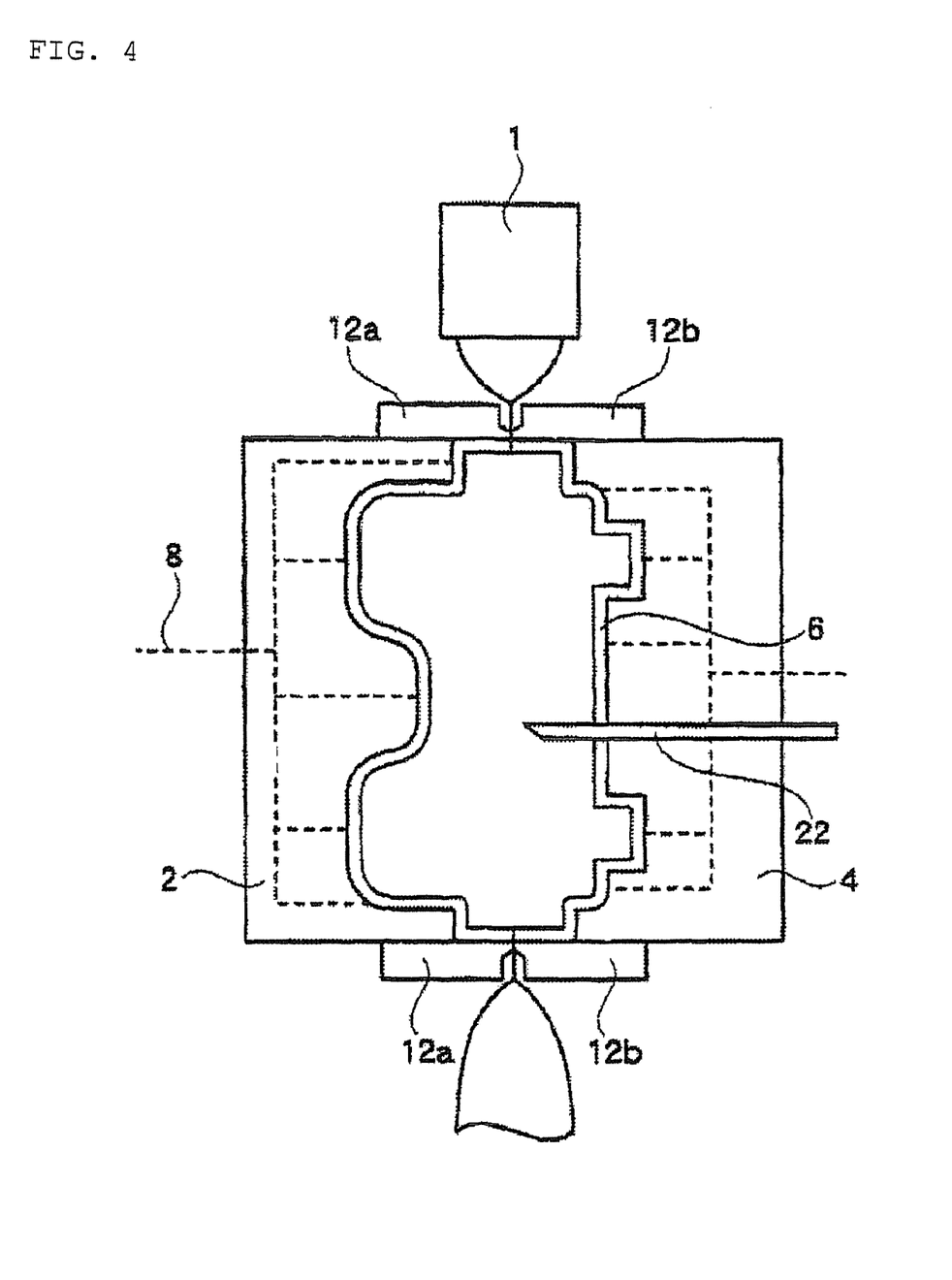
FIG. 4 is a die layout view in the last stage of the parison expansion step.
Figure 5:
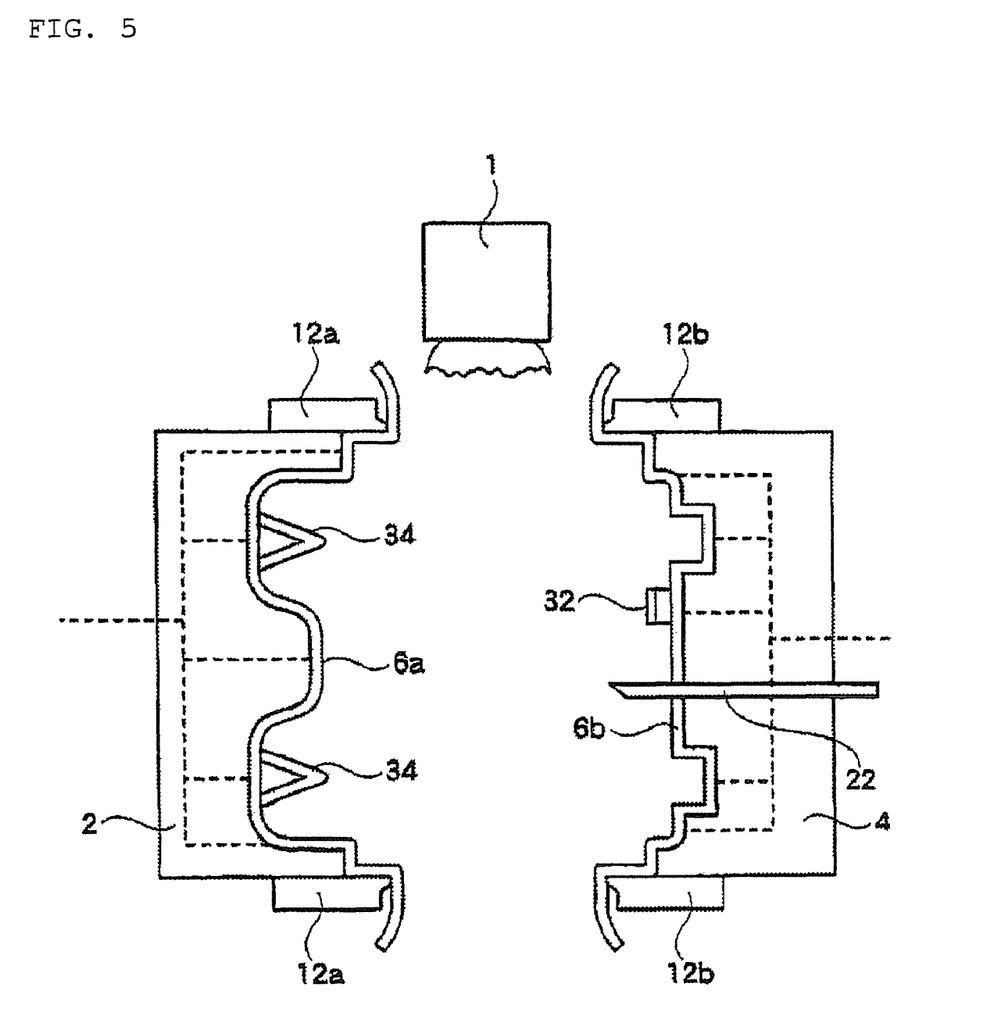
FIG. 5 is a die layout view of a primary die opening step next to the parison expansion step and a parts assembly step subsequent to the primary die opening step.
Figure 6:
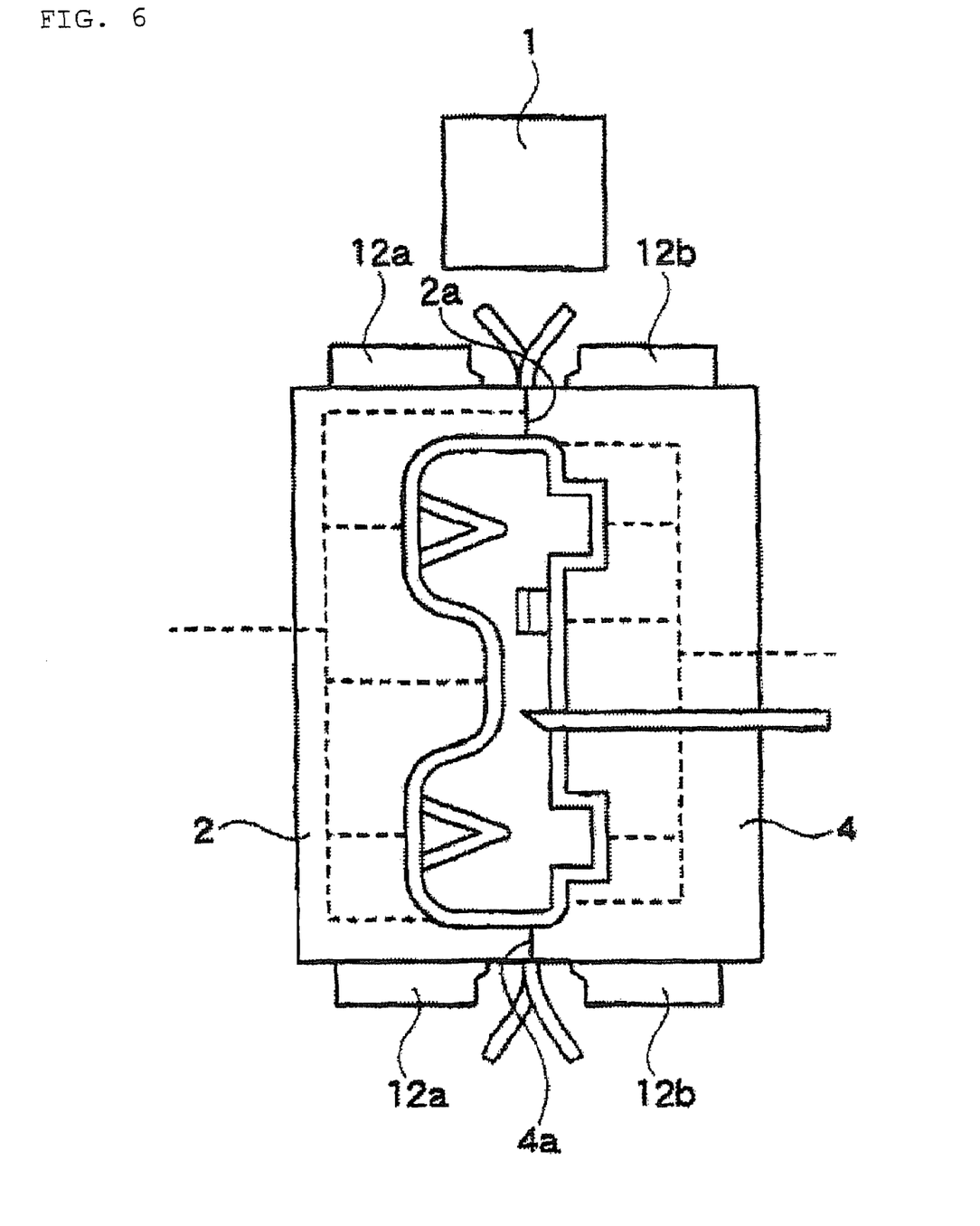
FIG. 6 is a die layout view of a secondary die closing step next to the parts assembly step and a re-fuse bonding step subsequent to the secondary die closing step.
Figure 7:
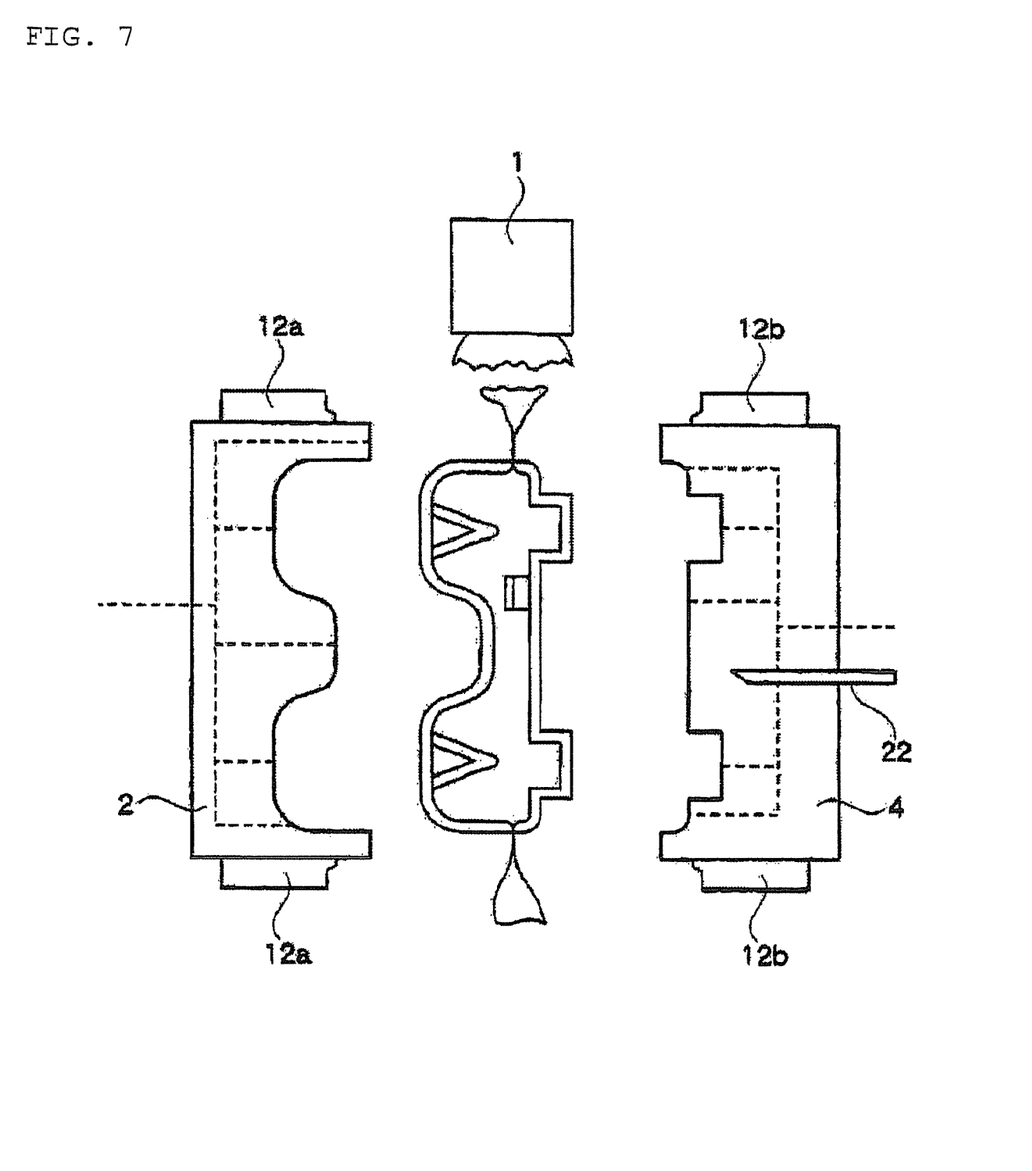
FIG. 7 is a die layout view of a secondary die opening step next to the re-fuse bonding step.

That is, abutment portions 12c, 12d of the slide dies 12a, 12b are arranged and are movable between first positions, where they project externally from the open end surfaces 2a, 4a of the dies 2, 4, as shown in FIGS. 2, 3, 4, and 5 and second positions, where they are located inward of the open end surfaces 2a, 4a of the dies 2, 4 as shown in FIGS. 6 and 7.

The widths a of the mesh portions of the dies 2, 4 are not particularly limited, and it may be any widths with which divided hollow molded bodies can be joined.

Further, the abutting portions 12c, 12d of the slide dies 12a, 12b are formed in a steeple shape with a narrowed width.

Figure 3:
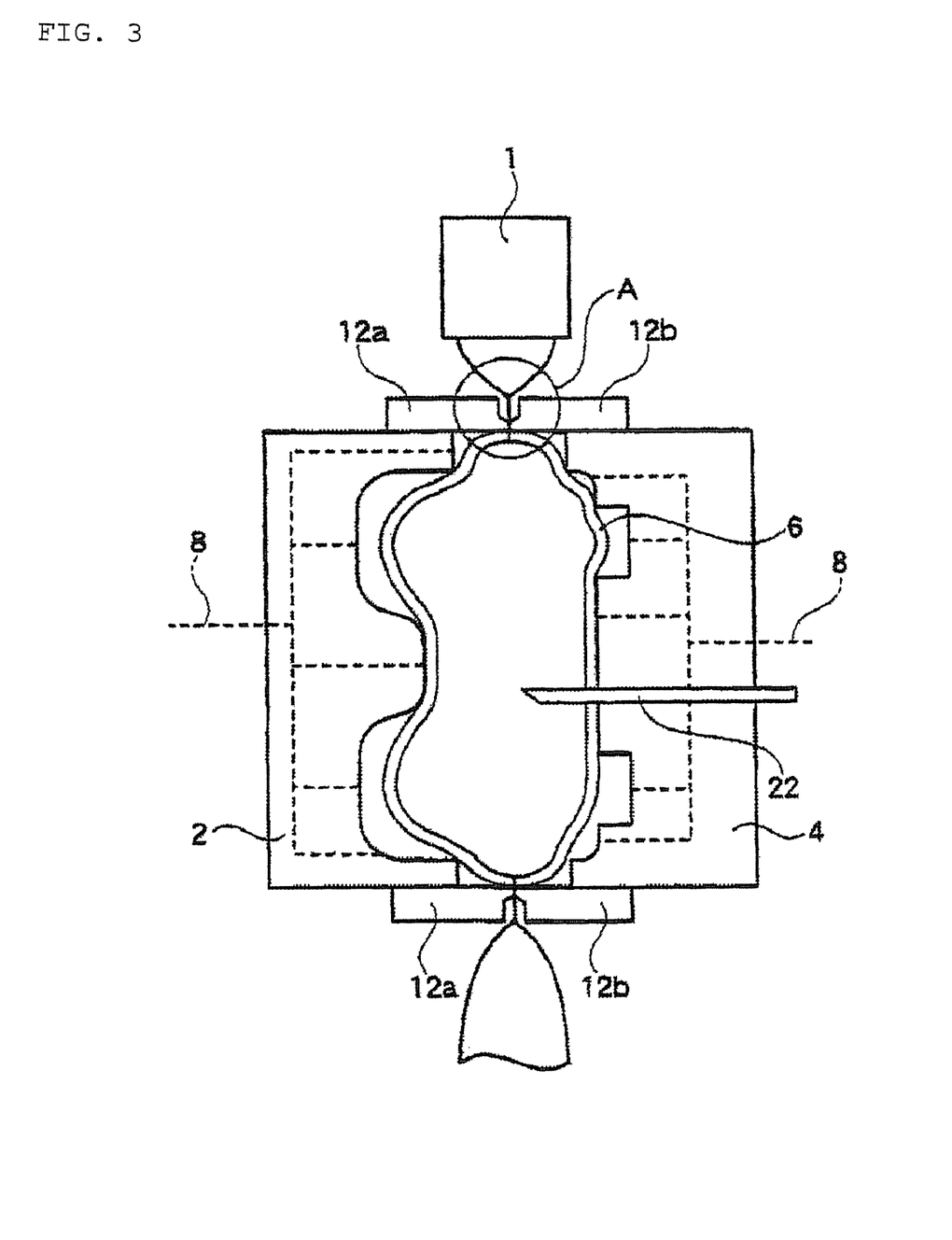
FIG. 3 is a die layout view in the first stage of a parison expanding step next to the parison clamping step of the manufacturing method.
Figure 8:
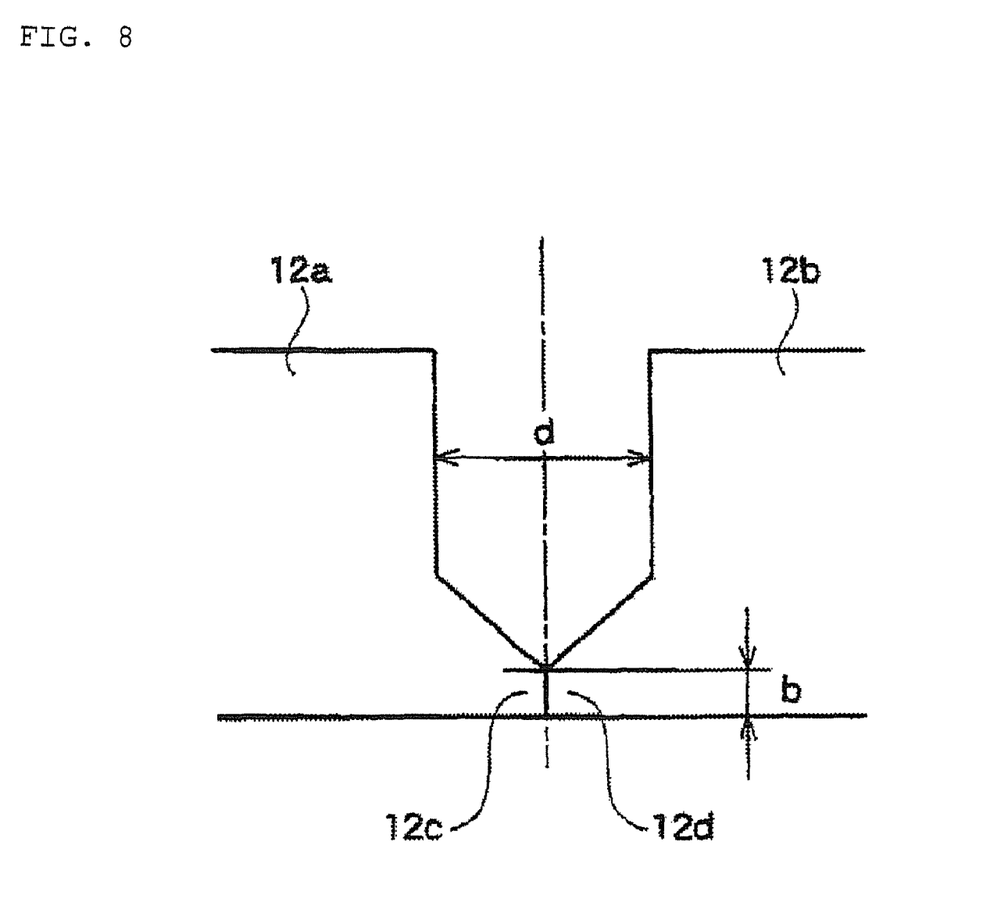
FIG. 8 is an enlarged view of a portion A shown in FIG. 3.

Further, as shown in FIG. 8, which shows a portion A shown in FIG. 3 in enlargement, the widths "b" of the meshed portions 12c, 12d of the slide dies 12a, 12b are preferably 5 mm or less and more preferably within the range of 2 to 4 mm. A gap "d" for forming the meshed portions 12c, 12d is preferably 10 mm or more.

Although thermoplastic resin used for the hollow body manufacturing method of the present invention is not particularly limited, it ordinarily has a polyolefin layer and a barrier layer selected from EVOH or polyamide. An arrangement having the innermost layer and the outermost layer each composed of polyolefin layer and an intermediate layer composed of a barrier layer is preferable from a view point of keeping mechanical strength of the hollow body. Further, since a bonding property between the polyolefin layer and the barrier layer is inferior, it is preferable to improve the bonding property by interposing a modified polyolefin layer between the both layers. Polyethylene obtained by graft polymerizing monomer of polar group such as multivalent carboxylic acid is exemplified as the modified polyolefin layer.

Polyethylene is preferable as polyolefin, and further high density polyethylene having a density within the range of 930 to 965 kg/m$^3$ is preferably used. High density polyethylene having an MFR (melt flow rate) within the range of 0.01 to 0.1 g/10 minutes and a melting point within the range of 120 to 135° C. is preferable. EVOH is preferable as a resin for a barrier layer, and EVAL (registered trademark) commercially available from Kuraray Co., Ltd., etc. for example, can be used.

A manufacturing method for obtaining a resin hollow body such as the automobile fuel tank by using the dies described above will be specifically explained below.

The manufacturing method of the present invention is composed of a parison clamping step 10 also acting as a step of closing the primary die, an inside die suctioning step 15 for sucking spaces in the dies that clamp the parison, a parison expanding step 20 for expanding the parison, a primary die opening step 30 for opening a pair of dies, a parts assembly step 40 for attaching predetermined parts in the opened dies, a secondary die closing step 50 for closing the pair of dies again, a re-fuse bonding step 60 for joining abutting portions of half-divided tubes again, and a step 70 of opening the secondary die opening step 70 for taking out an integrally welded hollow molded body from said dies as a product.

And as shown in FIG. 2, at the initial parison clamping step 10, the tubular parison 6 extruded to a predetermined length from a die head 1 disposed to a extruder, which is not shown, is loaded between a pair of dies 2, 4 opened from each other. At the time, slide dies 12a, 12b should be located at forward positions, that is, at the first positions. Thereafter, the dies are closed. With this operation, the tubular parison 6 is clamped with the abutting portions 12c, 12d of the slide dies 12a, 12b as shown in FIG. 3.

Note that when the dies are closed, it is preferable that the temperature of the inner surface of the parison is 190 to 220° C., for example 210° C., when the parison 6 is a multilayered parison composed of a polyethylene layer and an EVOH layer, and that a temperatures of the pair of dies 2, 4 and the slide dies 12a, 12b is cooled to 5 to 40° C. and preferably to around 10° C.

As described above, when the parison 6 is clamped between the dies 2, 4, the parison 6 is expanded by introducing an appropriate gas, for example, compressed air into the parison 6 through an air nozzle 22 inserted to one die 4, thereby a hollow molded body 6 is obtained. Thereafter, the insides of the dies 2, 4 are sucked through the branched air suction paths 8 by driving the pressure reducing means from the outside. Note that the insides of the dies 2, 4 may be sucked simultaneously with the introduction of compressed air into the parison 6 or before the introduction of the compressed air. As described above, at the parison expanding step 20, since only the slide dies 12a, 12b come into contact with each other and the main dies 2, 4 do not come into contact with each other, as shown in FIG. 3, the hollow molded body 6 can be easily divided when the dies are opened later.

In the present invention, since the order of the inside die suctioning step 15 and the parison expanding step 20 is not limited at all, they may be carried out in an reverse order or may be carried out at the same time. Note that, when there is not a possibility that the parison 6 or the hollow molded body 6 drops from the dies 2, 4 judging from a size, a shape, and the like of a product, the inside die suctioning step 15 can be omitted.

Although the outer peripheral surfaces of the hollow molded body 6 in contact with inner wall surfaces of the cooled dies 2, 4 become solidified at once, the inner peripheral surface side of the hollow molded body 6 is still in a melted state. In this temperature environment, the shape of the fuel tank is approximately given as shown in FIG. 4. A period of time during which the compressed air is introduced is ordinarily about 5 seconds to 45 seconds and preferably about 30 seconds although it is different depending on the discharge rate of a compression pump and the capacity of the tank. The pressure of the compressed air is ordinarily 3 to 15 kg/cm$^2$ and preferably 4 to 6 kg/cm$^2$. Note that the method of molding the parison extruded into the dies to shapes of the dies, at the parison clamping step 10 acting also as the primary die closing step and the parison expanding step 20 for expanding the parison, is known and disclosed in for example, Japanese Patent Application Laid-Open Publication No. 2004-160719.

As described above, when the parison 6 is expanded by introducing the compressed air thereinto, the dies 2, 4 are opened once as shown in FIG. 5. The insides of the dies are sucked until the re-fuse bonding step to prevent the drop of the hollow molded body 6, to which the shape is given from the dies 2 and 4. Since at the primary die opening step 30 of the dies 2 and 4, the outer peripheral surface of the hollow molded body 6 is almost solidified by the cooled dies 2 and 4 and further the inner peripheral surface of the hollow molded body 6 is in a semi-melted state, the hollow molded body 6 is also separated to half-divided bodies if the dies 2 and 4 are separated from each other. When the dies are opened, since the hollow molded body 6 is clamped only by the abutting portions 12c and 12d of the slide dies 12a and 12b, it can be easily divided. Note that when the hollow molded body 6 cannot be easily divided into the half-divided bodies, the temperatures of the slide dies 12a and 12b may be set higher than that of the main dies 2 and 4 and are preferably set to, for example, about 80 to 100° C. so that divided surfaces do not become solidified. Or, it is a possible to accelerate cutting the partitioning surface with a cutter and the like.

In contrast, as shown in FIG. 5, separate parts such as a valve 32, wave barriers 34 for preventing generation of noise and the like, which are installed in the fuel tank later, are previously formed as separate members. After these separate members 32, 34 and the like are formed separately, they are placed on a heater and the like in a separate location so that the contact side of the surface of in the members with the fuel tank can be made to a melted or semi-melted state. When the valve 32, the wave barriers 34 and the like whose contact surfaces are previously made to the melted state are prepared, they are inserted into the insides of the divided dies 2 and 4 and disposed at predetermined positions of the hollow molded body 6.

Note that when the parts assembly step 40 is carried out, the inner surface of the hollow molded body 6 may be done internal decoration, for example, by applying a coating agent and forming concave-convex portions, patterns and the like thereonto, in addition to the assembly of the parts.

As shown in FIG. 5, after the interior member 32, the wave barrier 34 and the like are installed at the predetermined positions of the divided hollow molded bodies 6a and 6b, the slide dies 12a and 12b are moved backward, and the dies 2 and 4 are closed again. As described above, preparation for rejoint at the step 60 of re-fuse bonding to be executed later is completed.

As shown in FIG. 6, at the re-fuse bonding step 60, the dies 2 and 4 are closed and compressed air is introduced again. At the time, the slide dies 12a and 12b are moved backward up to the second positions described above. It is preferable that a period of time, before the dies are closed and compressed air is introduced again at the secondary die closing step 50 after the hollow molded body 6 is extruded, is as short as possible. The period is more preferably 100 seconds or less to join the hollow molded bodies 6 while keeping them in the melted state. When the period is short, since the hollow molded bodies 6 can be rejoined before the inner surfaces thereof are cooled, fuse bonded strength of the rejoined portion of the main body can be kept high. Further, since the valve 32, the wave barriers 34 and the like can be attached to the insides while the inner surfaces of the hollow molded bodies are in the melted state, they can be securely integrated. Then, as shown in FIG. 7, when the dies 2 and 4 are opened again after the hollow molded body 6 is cooled, a resin fuel tank can be obtained from the inside of the dies.

As described above, according to the present invention, since a conventionally required job for forming a hole after blow molding is carried out is not necessary, excellent workability can be obtained. Since the half-divided hollow molded bodies are rejoined completely, joint strength of the hollow molded main body can be kept to be high level. Further, since the barrier layers are joined as shown in FIG. 6 to each other on the joint surface, leakage of gas can be securely prevented.

Note that a resin fuel tank mentioned above ordinarily has a layer composed of polyolefin and a barrier layer of EVOH, nylon and the like and is preferably composed of a six-layered resin structure. That is, the structure is composed of HDPE (high density polyethylene), recycle resin, an adhesive layer (for example, polyolefin obtained by copolymerizing polar monomer such as maleic acid.), EVOH (ethylene vinyl alcohol copolymer), an adhesive layer (for example, polyolefin obtained by copolymerizing polar monomer such as maleic acid, etc.), HDPE (high density polyethylene), and they have thickness ratios of, for example, 13, 40, 2, 3, 2, 40%, respectively, although they can be appropriately changed. Note that the recycle product is a waste material (burr) from a resin fuel tank recovered after molded. When six types of these resins are prepared and separately extruded by an extruder, since layer-like resins come into contact with each other in a melted state, the hollow molded body 6 having an integrated six-layered structure can be obtained.

A method of manufacturing a multilayered blow molded body having the six-layered structure composed of HDPE/recycle resin/adhesive layer/EVOH/adhesive layer/HDPE in this order from an outermost layer will be specifically explained. Note that since this is only an example showing a mode of the present invention, a technical idea of the present invention is not restricted thereto.

High density polyethylene to be used has a density of 950 kg/m$^3$, an MFR of 0.03 g/10 minutes and a melting point of 131° C. EVAL (registered trademark) that is ethylene vinyl alcohol copolymer commercially available from Kuraray Co., Ltd. is used as the resin of the barrier layer. Polyolefin obtained by copolymerizing maleic acid of polar monomer (ADMER (registered trademark) of Mitsui Chemicals, Inc.) is used as the adhesive layers.

After a multilayered parison is extruded into the dies, the first die closing step is carried out. When the dies are closed, the temperature of the parison 6 is set to 200° C. The pair of dies 2, 4 are cooled to around 10° C. The temperatures of the slide dies 12a, 12b are set to 80° C.

When the parison 6 is clamped, it is expanded by introducing compressed air thereinto through the air nozzle 22, thereby the hollow molded body 6 is obtained. Interval of time to introduce the air is set to about 30 seconds.

When the parison 6 is expanded by the compressed air introduced thereinto, the dies 2 and 4 are opened once while sucking the insides thereof to prevent the hollow molded body 6, to which the shape is given, from dropping from the dies 2 and 4. With this operation, the hollow molded body 6 is also separated to the half-divided bodies.

The inner surfaces of the divided hollow molded bodies 6 are in the melted state, and the separate members such as the wave barrier 34 and the like whose adhesive surfaces are previously heated and melted are disposed at the predetermined positions of the hollow molded bodies 6 and attached thereto.

The slide dies 12a and 12b are moved back, and the dies 2 and 4 are closed again. After the dies are closed, compressed air is introduced again, and the re-fuse bonding step 60 is carried out. A period of time after the parison is extruded and the compressed air is introduced again at the secondary die closing step is set to 50 seconds. In doing so, the temperature of the inner surface of the parison is about 160 to 190° C. Further, die closing pressure is set to about 150000 kg/cm$^2$ and, a die closing interval is set to 60 seconds. At the re-fuse bonding step, there can be obtained the hollow molded body in which the polyethylene of the innermost layer is completely joined, further the EVOH layers as the barrier layers are also joined, the joint strength of the main body is kept high, and permeation of a volatile component is prevented.

Although the manufacturing method according to the present invention has been explained above, the present invention is by no means restricted thereto. For example, in the above example, although the present invention is explained as to the example in which it is applied to the automobile fuel tank, hollow molded bodies other than the automobile fuel tank can be manufactured likewise.

The invention claimed is:

1. A method of manufacturing a resin hollow body by hollow blow molding comprising:
    a step of obtaining a hollow molded body by blow molding a thermoplastic resin parison in a cavity of dividable dies (assumed that the parison is not cut off to two or more pieces before it is blow molded;
    a step of dividing the hollow molded body by opening the dividable dies after the parison is blow molded in the cavity in the dividable dies;
    a step of attaching at least one part on an inner surface of divided hollow molded bodies and/or modifying the inner surfaces of the divided hollow molded bodies; and
    a step of obtaining an integrated hollow body by welding the divided hollow bodies with the dies closed.

2. A method of manufacturing a resin hollow body using a blow molding die assembly which comprises:
    a pair of main dies (2), (4) formed with a dividable cavity therein by closing the open end surfaces (2a), (4a) thereof with each other; and
    a pair of slide dies (12a), (12b) being disposed outside of the pair of main dies (2), (4) and having abutting portions (12c), (12d) that move between first positions where the abutting portions (12c), (12d) project outward from the open end surfaces (2a), (4a) of the main dies (2), (4) and second positions where the abutting portions are located inward of the open end surfaces (2a), (4a), the method comprising:
    a step of obtaining a hollow molded body by blow molding a thermoplastic resin parison in the cavity in the dividable dies in a state in which the abutting portions (12c), (12d) are located at the first positions where the abutting portions (12c), (12d) project outward from the open end surfaces (2a), (4a), wherein the parison is not cut off to two or more pieces before it is blow molded;
    a step of dividing the hollow molded body by opening the dividable dies after the parison is blow molded in the cavity in the dividable dies;
    a step of attaching at least one part on an inner surface of the divided hollow molded bodies and/or modifying the inner surfaces of the divided hollow molded bodies in a state in which the abutting portions (12c), (12d) are located at either of the first positions and the second positions; and
    a step of obtaining an integrated hollow body by welding the divided hollow bodies with the dies closed in a state in which the abutting portions (12c), (12d) are located at the second positions where the abutting portions (120c), (12d) are located inner than the open end surfaces (2a), (4a).

3. A method of manufacturing a resin hollow body using a blow molding die assembly which comprises:

a pair of main dies (2), (4) formed with a dividable cavity therein by closing the open end surfaces (2a), (4a) thereof with each other; and a pair of slide dies (12a), (12b) being disposed outside of the pair of main dies (2), (4) and having abutting portions (12c), (12d) that between first positions where the abutting portions (12c), (12d) project outward from the open end surfaces (2a), (4a) of the main dies (2), (4) and second positions where the abutting portions are located inward of the open end surfaces (2a), (4g), the method comprising:

a parison clamping step (10) for clamping a thermoplastic resin parison (6), extruded to a tubular state, in the cavity of the pair of main dies (2), (4) and clamping the parison (6) by the abutting portions (12c), (12d) of the slide dies (12a), (12b) by disposing the slide dies (12a), (12b) at the first positions where they project from open end surfaces (2a), (4a) of the main dies (2), (4);

an inside die suctioning step (15) for sucking the space between the outer surface of the parison (6) and inner surfaces of the main dies (2), (4) by suction means from the outside, wherein parison (6) is clamped by the abutting portions (12c), (12d) of the pair of slide dies (12a), (12b) at the parison clamping step (10);

a parison expanding step (20) for expanding the parison (6) by introducing a gas into the inside of the parison (6) either before the inside die suctioning step (15) is carried out, after the inside die suctioning step (15) is carried out, or at the time when the inside die suctioning step (15) is carried out;

a primary die opening step (30) for opening the pair of main dies (2), (4) along with half-divided hollow molded bodies (6a), (6b) after the outer surface of the parison (6) is expanded at the parison expanding step (20) and is caused to come into intimate contact with inner peripheral surfaces of the main dies (2), (4);

a parts assembly step (40) for attaching predetermined parts (32), (34) and the like, which are previously formed as separate members, on the inner surfaces of the parison (6) in the pair of main dies (2), (4) separated from each other at the primary die opening step (30), a secondary die closing step (50) for closing the pair of main dies (2), (4) again after the predetermined parts (32), (34) and the like are assembled to the inner surface of the hollow molded body (6) in the main dies (2), (4) at the parts assembly step (40);

a re-fuse bonding step (60) for joining the abutting portions of the half-divided hollow molded bodies (6a), (6b) closed at the secondary die closing step (50); and a secondary die opening step (70) for taking out a product of a hollow molded body integrated at the re-fuse bonding step (60) from the main dies (2), (4), wherein the steps of the parison clamping step (10), the an inside die suctioning step (15), the parison expanding step (20) and the primary die opening step (30) are carried out in a state in which the abutting portions (12c), (12d) of the slide dies are located at first positions where they project outward from the open end surfaces (2a), (4a) of the main dies (2), (4); and the steps of the secondary die closing step (50) and the re-fuse bonding step (60) are carried out in a state in which the abutting portions (12c), (12d) of the slide dies are located at second positions where they are located inward of the open end surface (2a), (4a) of the main dies (2), (4).

* * * * *